UNITED STATES PATENT OFFICE.

CARL THEODOR THORSSELL AND HARALD LUDVIG REINHOLD LUNDÉN, OF GOTTENBORG, SWEDEN.

PROCESS FOR THE PRODUCTION OF NITRATES BY MEANS OF BACTERIA.

1,288,755.        Specification of Letters Patent.     Patented Dec. 24, 1918.

No Drawing.       Application filed April 10, 1918. Serial No. 227,795.

*To all whom it may concern:*

Be it known that we, CARL THEODOR THORSSELL, a citizen of Sweden, residing at Södra Hamngatan 11, Gottenborg, Sweden, and HARALD LUDVIG REINHOLD LUNDÉN, a citizen of Sweden, residing at Södra Hamngatan 11, Gottenborg, Sweden, have invented certain new and useful Improvements in Processes for the Production of Nitrates by Means of Bacteria, of which the following is a specification.

When oxidizing ammonia, ammonium combinations or organic nitrogen combinations by means of bacteria these latter are usually cultivated in a solid substratum of nutriment, for instance in mellow soil, said substratum being watered with a liquid in which the above nitrogen combinations are dissolved. It is not necessary to use a solid substratum as the bacteria also may be inoculated and developed in the liquid, which in this case must be aerated in some way or other, i. e. provision must be made that at least 1 or 2 per cent. of oxygen is dissolved in the solution. The presence of physiologically basic matters is also necessary for the purpose of immediately neutralizing the nitric acid formed at the oxidation. Such materials are chalk, easily decomposed silicates, magnesium oxid, carbonate of sodium, etc.

It is not necessary to extract the nitrificating bacteria in pure cultivation as raw cultivation also can be used. Certain extraneous organisms, however, such as molds and protozoa, are injurious.

The object of the present invention is to prevent the forming of molds or other enemies to the nitrificating bacteria. This is attained by avoiding the use of such materials for a substratum of nutriment as contain nutriment for the enemies of the nitrificating bacteria. Said enemies require an organic nutriment, organic carbon, organic combinations and the like. The nitrificating bacteria, however, have also another attribute whereby they differ from the above enemies and which may be used with advantage for avoiding the forming of the latter. The fact is that the nitrificating bacteria are extraordinarily insensitive to inorganic poisons. It is known that salts of copper and other salts of the heavy metals do not impede the activity of the nitrificating bacteria. Our experiments have shown that cyanids and rhodanids also are harmless as well as a temporary treatment with phenol. When $\frac{1}{8}$ gram of phenol per liter is added to the liquid of nutriment and this liquid is used for watering during 24 hours, whereafter watering with liquid not containing phenol, it proves that the oxidizing action is paralyzed during two or three days, but after that time the normal activity is regained.

Trials are also made with molds and the action of different poisons is examined. Active poisons are salts of copper, rhodanids, cyanids, fluorids and phenol.

Now when it happens that the oxidation, i. e. the production of the plant, languishes an examination is made whether this depends upon extraneous organisms. The liquids and the substratum, when such is used, are examined with regard to molds, protozoa and other extraneous organisms in the way explained in bacteriological handbooks. If it proves that such organisms are at hand one of the following methods is used.

1. Cuprous cyanid is added to the substratum or silted up in the liquid of nutriment. This salt is hardly soluble and does not make the finished product impure. About 100 grams per cubic meter of the substratum or the liquid of nutriment are used.

2. During 24 hours a liquid containing $\frac{1}{8}$ gram of phenol per liter is used for watering and thereafter the usual liquid is used.

Instead of the usual poisons cuprous rhodanid, cyanid of sodium, fluorid of sodium, phenols, anilin, etc., can also be used.

The poisons are with advantage added in the form of insoluble salts so that they are not washed away by the current of the liquid. When a soluble salt is used it is added in a low concentration in order to protect the desired finished article from impurities.

Having thus described our invention, what we claim as new and desire to secure by Letters Patent is:

1. The herein described process of oxidizing nitrogen compounds, which consists in inoculating a nutriment medium with a nitrificating bacteria, adding to the medium a material which is not injurious to the nitrificating bacteria and is adapted to destroy bacteria which are injurious to the nitrificating bacteria, and introducing the product thus obtained into the presence of the nitrogen compounds to be oxidized.

2. The herein described process of oxidizing nitrogen compounds, which consists in inoculating a nutriment medium with a nitrificating bacteria, adding to the medium an inorganic poison which is not injurious to the nitrificating bacteria and is adapted to destroy bacteria which are injurious to the nitrificating bacteria, and introducing the product thus obtained into the presence of the nitrogen compounds to be oxidized.

3. The herein described process of oxidizing nitrogen compounds, which consists in inoculating a nutriment medium with a nitrificating bacteria, adding to the medium an inorganic poison in the form of an insoluble salt which is not injurious to the nitrificating bacteria and is adapted to destroy bacteria which are injurious to the nitrificating bacteria, and introducing the product thus obtained into the presence of the nitrogen compounds to be oxidized.

4. The herein described process of oxidizing nitrogen compounds, which consists in inoculating a nutriment medium with a nitrificating bacteria, adding to the medium an inorganic poison in the form of a salt of low concentration and which is not injurious to the nitrificating bacteria and is adapted to destroy bacteria which are injurious to the nitrificating bacteria, and introducing the product thus obtained into the presence of the nitrogen compounds to be oxidized.

In testimony whereof, we have signed our names to this specification in the presence of two subscribing witnesses.

CARL THEODOR THORSSELL.
    HARALD LUDVIG REINHOLD LUNDÉN.

Witnesses:
    ROBERT S. SAMUEL,
    SYLVESTER E. ROTHCHILD, Jr.